(12) United States Patent
Aksu et al.

(10) Patent No.: US 12,489,907 B2
(45) Date of Patent: Dec. 2, 2025

(54) METHOD AND APPARATUS FOR SIGNALING OF REGIONS AND REGION MASKS IN IMAGE FILE FORMAT

(71) Applicant: Nokia Technologies Oy, Espoo (FI)

(72) Inventors: Emre Baris Aksu, Tampere (FI); Miska Matias Hannuksela, Tampere (FI); Kashyap Kammachi Sreedhar, Tampere (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/555,066

(22) PCT Filed: Mar. 31, 2022

(86) PCT No.: PCT/IB2022/053042
§ 371 (c)(1),
(2) Date: Oct. 12, 2023

(87) PCT Pub. No.: WO2022/224063
PCT Pub. Date: Oct. 27, 2022

(65) Prior Publication Data
US 2024/0205422 A1    Jun. 20, 2024

Related U.S. Application Data

(60) Provisional application No. 63/176,457, filed on Apr. 19, 2021.

(51) Int. Cl.
*H04N 19/17* (2014.01)
*H04N 19/167* (2014.01)
*H04N 19/70* (2014.01)

(52) U.S. Cl.
CPC ........... *H04N 19/17* (2014.11); *H04N 19/167* (2014.11); *H04N 19/70* (2014.11)

(58) Field of Classification Search
CPC ....... H04N 19/17; H04N 19/167; H04N 19/70
See application file for complete search history.

(56) References Cited

U.S. PATENT DOCUMENTS 5,737,075 A * 4/1998 Koch ................... G01S 7/4816
356/310
6,671,797 B1 * 12/2003 Golston ............. G06F 9/30018
712/213

(Continued)

FOREIGN PATENT DOCUMENTS

CN       108169807 B   *  8/2019   ............. G01N 21/01
JP       H10161637 A   *  6/1998

OTHER PUBLICATIONS

Yajima Akihiko translation of JP H10161637 A Sep. 26, 1997 (Year: 1997).*

(Continued)

*Primary Examiner* — Zaihan Jiang
(74) *Attorney, Agent, or Firm* — McCarter & English LLP

(57) ABSTRACT

Various embodiments provide an apparatus, a method, and a computer program product. The apparatus includes at least one processor, and at least one non-transitory memory including computer program code; wherein the at least one memory and the computer program code are configured to, with the at least one processor, cause the apparatus at least to perform: define or extend a file format data structure to comprise: a cell size to indicate dimensions of a region, in pixels, comprising a mask value; a mask coding method to indicate a coding method applied to a mask or data of a media; mask coding parameters to indicate additional encoding or decoding parameters needed to process the coded mask data; and a mask configuration comprising the mask related information as a mask configuration structure.

20 Claims, 9 Drawing Sheets

(56) References Cited

U.S. PATENT DOCUMENTS

| | | | |
|---|---|---|---|
| 10,950,199 B1* | 3/2021 | Buckley | G06T 5/77 |
| 2010/0293344 A1 | 11/2010 | Nishino et al. | |
| 2014/0015831 A1* | 1/2014 | Kim | G06F 3/04815 |
| | | | 345/419 |
| 2017/0249525 A1* | 8/2017 | Guarnieri | G06T 7/143 |
| 2021/0066407 A1* | 3/2021 | Ghosh | H10K 59/352 |
| 2021/0110787 A1* | 4/2021 | Buckley | G06T 5/77 |
| 2021/0233231 A1* | 7/2021 | Ikeda | G06T 7/0004 |
| 2022/0334428 A1* | 10/2022 | Aizawa | H04N 17/002 |

OTHER PUBLICATIONS

Zhong, Xing translation of CN 108169807 B Dec. 27, 2017 (Year: 2017).*

"Information technology—High efficiency coding and media delivery in heterogeneous environments—Part 12: Image File Format—Amendment 2: Support for VVC, EVC, slideshows and other improvements", ISO/IEC 23008-12: 2017/DAM 2:2021(E), 2021, 39 pages.

"Information Technology—Coding of Audio-Visual Objects—Part 12: ISO Base Media File Format", ISO/IEC 14496-12, Fifth edition, Dec. 15, 2015, 248 pages.

"Information Technology—Coding of Audio-Visual Objects—Part 14: MP4 File Format", ISO/IEC 14496-14, First edition, Nov. 15, 2003, 18 pages.

"Information Technolog—Coding of Audio-Visual Objects—Part 15: Advanced Video Coding (AVC) File Format", ISO/IEC 14496-15, First edition, Apr. 15, 2004, 29 pages.

"High Efficiency Video Coding", Series H: Audiovisual and Multimedia Systems, Infrastructure of audiovisual services—Coding of moving video, Recommendation ITU-T H.265, Feb. 2018, 692 pages.

Deutsch, "Deflate Compressed Data Format Specification version 1.3", RFC 1951, Network Working Group, May 1996, pp. 1-14.

Deutsch et al., "ZLIB Compressed Data Format Specification version 3.3", RFC 1950, Network Working Group, May 1996, pp. 1-11.

"Information Technology—Generic Coding of Moving Pictures and Associated Audio Information: Systems", Series H: Audiovisual and Multimedia Systems, Infrastructure of Audiovisual Services—Transmission Multiplexing and Synchronization, Recommendation ITU-T H.222.0, Mar. 2017, 291 pages.

"Information technology—Generic coding of moving pictures and associated audio information: Video", Series H: Audiovisual and Multimedia Systems Infrastructure of audiovisual services—Coding of moving video, ITU-T Recommendation H.262, Feb. 2000, 220 pages.

"Information technology—Universal coded character set (UCS)", ISO/IEC 10646, Sixth edition, Dec. 2020, 9 pages.

"IEEE 802.11", Wikipedia, Retrieved on Nov. 4, 2023, Webpage available at : https://en.wikipedia.org/wiki/IEEE_802.11.

"Video Coding for Low Bit Rate Communication", Series H: Audiovisual and Multimedia Systems, Infrastructure of audiovisual services—Coding of moving Video, ITU-T Recommendation H.263, Jan. 2005, 226 pages.

"Advanced Video Coding for Generic Audiovisual services", Series H: Audiovisual and Multimedia Systems, Infrastructure of audiovisual services—Coding of moving Video, Recommendation ITU-T H.264, Apr. 2017, 812 pages.

International Search Report and Written Opinion received for corresponding Patent Cooperation Treaty Application No. PCT/IB2022/053042, dated Jul. 14, 2022, 15 pages.

Ruellan et al., "[HEIF] Region Annotations", Canon Research Centre France, ISO/IEC JTC1/SC29/WG3 MPEG 2021/m56024, Jan. 2021, 6 pages.

* cited by examiner

METHOD AND APPARATUS FOR SIGNALING OF REGIONS AND REGION MASKS IN IMAGE FILE FORMAT

RELATED APPLICATION

This application claims priority to PCT Application No. PCT/IB2022/053042, filed on Mar. 31, 2022, which claims priority to U.S. Provisional Application No. 63/176,457, filed on Apr. 19, 2021, each of which is incorporated herein by reference in its entirety.

TECHNICAL FIELD

The examples and non-limiting embodiments relate generally to multimedia transport and, more particularly, to signaling of regions and region masks in an image file format.

BACKGROUND

It is known to provide standardized formats for signaling of media data.

SUMMARY

An example apparatus includes: at least one processor; and at least one non-transitory memory including computer program code; wherein the at least one memory and the computer program code are configured to, with the at least one processor, cause the apparatus at least to perform: define or extend a file format data structure to comprise: a cell size to indicate dimensions of a region, in pixels, comprising a mask value; a mask coding method to indicate a coding method applied to a mask or data of a media; mask coding parameters to indicate additional encoding or decoding parameters needed to process the coded mask data; and a mask configuration comprising the mask related information as a mask configuration structure.

The example apparatus may further include, wherein the cell size dimensions comprise M×N pixels, where M indicated horizontal number of pixels and N indicates vertical number of pixels.

The example apparatus may further include, wherein the mask coding method comprises values to indicate one or more of the following: no mask encoding scheme applied; DEFLATE compressed data coding is applied; or ZLIB compressed data coding is applied.

The example apparatus may further include, wherein the mask coding parameter further indicate a number of bytes in a coded mask array, when the mask coding method comprises a predetermined value.

The example apparatus may further include, wherein a value of the mask coding parameters is reserved, when the mask coding method comprises a value other than the predetermined value.

The example apparatus may be further caused to define a mask for the region, wherein the region is defined based on at least one of a region item or a metadata of the media.

The example apparatus may further include, wherein the file format data structure comprises a region item data structure.

The example apparatus may further include, wherein the file format data structure comprises the mask.

The example apparatus may further include, wherein the apparatus is further caused to define an item type, wherein an image item with the item type 'mski' is a mask item that defines the mask.

The example apparatus may further include, wherein the mask configuration comprises at least one of bits per pixel or byte packing information.

The example apparatus may further include, wherein when bits per pixel information of the mask configuration comprises 1, 2 or 4, pixels packed per byte are 8, 4 or 2, respectively, and wherein the byte packing comprises a big-endian order.

The example apparatus may further include, wherein no padding is put at the end of each line and a last data byte is padded, when the mask width is not a multiple of 8 pixels.

The example apparatus may further include, wherein when bits per pixel information of the mask configuration to 8, 16 or 24, the mask value of a pixel is represented with 1, 2 or 3 bytes, respectively, and wherein bytes of a pixel are serialized starting from the most significant byte.

The example apparatus may further include, wherein the apparatus is further caused to: define syntax elements to signal and configure the mask; and store the mask as high efficiency image file (HEIF) format file.

An example method includes defining or extend a file format data structure to comprise: a cell size to indicate dimensions of a region, in pixels, comprising a mask value; a mask coding method to indicate a coding method applied to a mask or data of a media; mask coding parameters to indicate additional encoding or decoding parameters needed to process the coded mask data; and a mask configuration comprising the mask related information as a mask configuration structure.

The example method may further include, wherein the cell size dimensions comprise M×N pixels, where M indicated horizontal number of pixels and N indicates vertical number of pixels.

The example method may further include, wherein the mask coding method comprises values to indicate one or more of the following: no mask encoding scheme applied; DEFLATE compressed data coding is applied; or ZLIB compressed data coding is applied.

The example method may further include, wherein the mask coding parameters further indicate a number of bytes in a coded mask array, when the mask coding method comprises a predetermined value.

The example apparatus may further include, wherein a value of the mask coding parameters is reserved, when the mask coding method comprises a value other than the predetermined value.

The example method may further include defining a mask for the region, wherein the region is defined based on at least one of a region item or a metadata of the media.

The example method may further include, wherein the file format data structure comprises a region item data structure.

The example method may further include, wherein the file format data structure comprises the mask.

The example method may further include defining an item type, wherein an image item with the item type 'mski' is a mask item that defines the mask.

The example method may further include, wherein the mask configuration comprises at least one of bits per pixel or byte packing information.

The example method may further include, wherein when bits per pixel information of the mask configuration comprises 1, 2 or 4, pixels packed per byte are 8, 4 or 2, respectively, and wherein the byte packing comprises a big-endian order.

The example method may further include, wherein no padding is put at the end of each line and a last data byte is padded, when the mask width is not a multiple of 8 pixels.

The example method may further include, wherein when bits per pixel information of the mask configuration to 8, 16 or 24, the mask value of a pixel is represented with 1, 2 or 3 bytes, respectively, and wherein bytes of a pixel are serialized starting from the most significant byte.

The example method may further include further include: defining syntax elements to signal and configure the mask; and storing the mask as high efficiency image file (HEIF) format file.

An example computer readable medium including program instructions for causing an apparatus to perform at least the following: defining or extend a file format data structure to comprise: a cell size to indicate dimensions of a region, in pixels, comprising a mask value; a mask coding method to indicate a coding method applied to data of a media; mask coding parameters to indicate additional encoding or decoding parameters needed to process the coded mask data; and a mask configuration comprising the mask related information as a mask configuration structure.

The example computer readable medium further includes, wherein the computer readable medium comprises a non-transitory computer readable medium.

An example computer readable medium may further include, wherein the computer readable medium further causes the apparatus to perform the methods as described in any of the previous paragraphs.

Another example apparatus includes: means for defining or extend a file format data structure to comprise: a cell size to indicate dimensions of a region, in pixels, comprising a mask value; a mask coding method to indicate a coding method applied to a mask or data of a media; mask coding parameters to indicate additional encoding or decoding parameters needed to process the coded mask data; and a mask configuration comprising the mask related information as a mask configuration structure.

The example apparatus may further include, wherein the apparatus further comprises means for performing the methods as described in one or more of the previous paragraphs.

BRIEF DESCRIPTION OF THE DRAWINGS

The foregoing aspects and other features are explained in the following description, taken in connection with the accompanying drawings, wherein.

DETAILED DESCRIPTION OF EXAMPLE EMBODIMENTS

Figure 1:
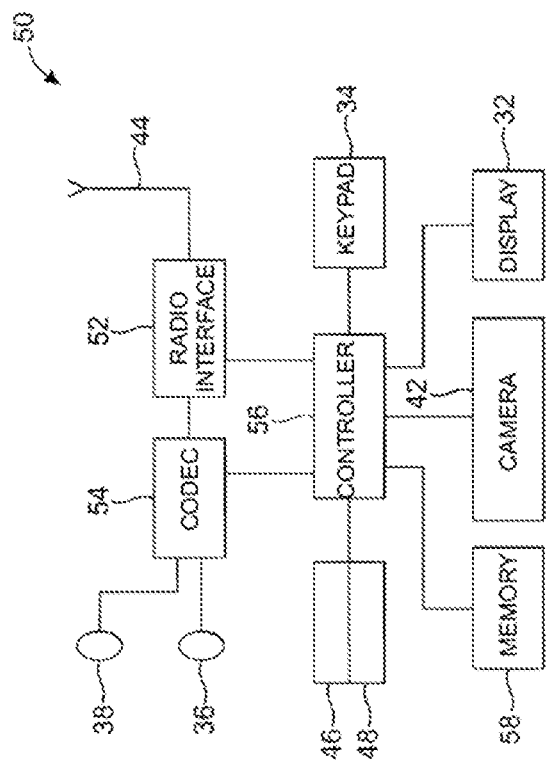
FIG. 1 shows schematically an electronic device employing embodiments of the examples described herein.

The following acronyms and abbreviations that may be found in the specification and/or the drawing figures are defined as follows:

| | |
|---|---|
| 3GP | 3GPP file format |
| 3GPP | 3rd Generation Partnership Project |
| 3GPP TS | 3GPP technical specification |
| 4CC | four character code |
| 4G | fourth generation of broadband cellular network technology |
| 5G | fifth generation cellular network technology |
| 5GC | 5G core network |
| ACC | accuracy |
| AI | artificial intelligence |
| AIoT | AI-enabled IoT |
| a.k.a. | also known as |
| AMF | access and mobility management function |
| AVC | advanced video coding |
| CABAC | context-adaptive binary arithmetic coding |
| CDMA | code-division multiple access |
| CE | core experiment |
| CU | central unit |
| DASH | dynamic adaptive streaming over HTTP |
| DCT | discrete cosine transform |
| DSP | digital signal processor |
| DU | distributed unit |
| eNB (or eNodeB) | evolved Node B (for example, an LTE base station) |
| EN-DC | E-UTRA-NR dual connectivity |
| en-gNB or En-gNB | node providing NR user plane and control plane protocol terminations towards the UE, and acting as secondary node in EN-DC |
| E-UTRA | evolved universal terrestrial radio access, for example, the LTE radio access technology |
| FDMA | frequency division multiple access |
| f(n) | fixed-pattern bit string using n bits written (from left to right) with the left bit first. |
| F1 or F1-C | interface between CU and DU control interface |
| gNB (or gNodeB) | base station for 5G/NR, for example, a node providing NR user plane and control plane protocol terminations towards the UE, and connected via the NG interface to the 5GC |
| GSM | Global System for Mobile communications |
| H.222.0 | MPEG-2 Systems is formally known as ISO/IEC 13818-1 and as ITU-T Rec. H.222.0 |
| H.26x | family of video coding standards in the domain of the ITU-T |
| HLS | high level syntax |
| IBC | intra block copy |
| ID | identifier |
| IEC | International Electrotechnical Commission |
| IEEE | Institute of Electrical and Electronics Engineers |
| I/F | interface |
| IMD | integrated messaging device |
| IMS | instant messaging service |
| IOT | internet of things |
| IP | internet protocol |
| ISO | International Organization for Standardization |
| ISOBMFF | ISO base media file format |
| ITU | International Telecommunication Union |
| ITU-T | ITU Telecommunication Standardization Sector |

-continued

| | |
|---|---|
| JPEG | joint photographic experts group |
| LTE | long-term evolution |
| LZMA | Lempel-Ziv-Markov chain compression |
| LZMA2 | simple container format that can include both uncompressed data and LZMA data |
| LZO | Lempel-Ziv-Oberhumer compression |
| LZW | Lempel-Ziv-Welch compression |
| MAC | medium access control |
| mdat | MediaDataBox |
| MME | mobility management entity |
| MMS | multimedia messaging service |
| moov | MovieBox |
| MP4 | file format for MPEG-4 Part 14 files |
| MPEG | moving picture experts group |
| MPEG-2 | H.222/H.262 as defined by the ITU |
| MPEG-4 | audio and video coding standard for ISO/IEC 14496 |
| MSB | most significant bit |
| NAL | network abstraction layer |
| NDU | NN compressed data unit |
| ng or NG | new generation |
| ng-eNB or NG-eNB | new generation eNB |
| NN | neural network |
| NNEF | neural network exchange format |
| NNR | neural network representation |
| NR | new radio (5G radio) |
| N/W or NW | network |
| ONNX | Open Neural Network eXchange |
| PB | protocol buffers |
| PC | personal computer |
| PDA | personal digital assistant |
| PDCP | packet data convergence protocol |
| PHY | physical layer |
| PID | packet identifier |
| PLC | power line communication |
| PNG | portable network graphics |
| PSNR | peak signal-to-noise ratio |
| RAM | random access memory |
| RAN | radio access network |
| RFC | request for comments |
| RFID | radio frequency identification |
| RLC | radio link control |
| RRC | radio resource control |
| RRH | remote radio head |
| RU | radio unit |
| Rx | receiver |
| SDAP | service data adaptation protocol |
| SGW | serving gateway |
| SMF | session management function |
| SMS | short messaging service |
| st(v) | null-terminated string encoded as UTF-8 characters as specified in ISO/IEC 10646 |
| SVC | scalable video coding |
| S1 | interface between eNodeBs and the EPC |
| TCP-IP | transmission control protocol-internet protocol |
| TDMA | time divisional multiple access |
| trak | TrackBox |
| TS | transport stream |
| TUC | technology under consideration |
| TV | television |
| Tx | transmitter |
| UE | user equipment |
| ue(v) | unsigned integer Exp-Golomb-coded syntax element with the left bit first |
| UICC | Universal Integrated Circuit Card |
| UMTS | Universal Mobile Telecommunications System |
| u(n) | unsigned integer using n bits |
| UPF | user plane function |
| URI | uniform resource identifier |
| URL | uniform resource locator |
| UTF-8 | 8-bit Unicode Transformation Format |
| WLAN | wireless local area network |
| X2 | interconnecting interface between two eNodeBs in LTE network |
| Xn | interface between two NG-RAN nodes |

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms 'data', 'content', 'information', and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a 'computer-readable storage medium', which refers to a non-transitory physical storage medium (e.g., volatile or non-volatile memory device), can be differentiated from a 'computer-readable transmission medium', which refers to an electromagnetic signal.

A method, apparatus and computer program product are provided in accordance with an example embodiment in order to implement mechanisms for signalling of at least one of regions and/or region masks in an image file format.

Figure 2:
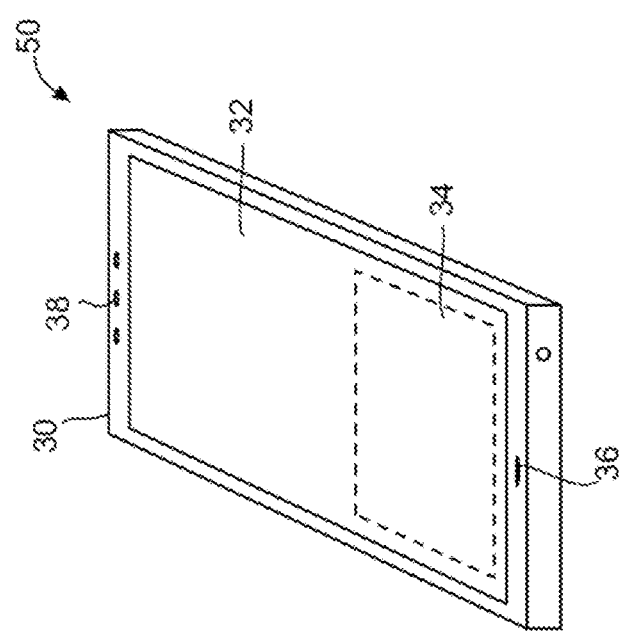
FIG. 2 shows schematically a user equipment suitable for employing embodiments of the examples described herein.

The following describes in detail suitable apparatus and possible mechanisms for signalling of at least one of regions and/or region masks in an image file format according to embodiments. In some embodiments, the signalling process may include a process for encoding and/or compressing the image file format. In this regard reference is first made to FIG. 1 and FIG. 2, where FIG. 1 shows an example block diagram of an apparatus 50. The apparatus may be an Internet of Things (IoT) apparatus configured to perform various functions, for example, gathering information by one or more sensors, receiving or transmitting information, analyzing information gathered or received by the apparatus, or the like. The apparatus may comprise a video coding system, which may incorporate a codec. FIG. 2 shows a layout of an apparatus according to an example embodiment. The elements of FIG. 1 and FIG. 2 will be explained next.

The electronic device 50 may for example be a mobile terminal or user equipment of a wireless communication system, a sensor device, a tag, or a lower power device. However, it would be appreciated that embodiments of the examples described herein may be implemented within any electronic device or apparatus.

The apparatus 50 may comprise a housing 30 for incorporating and protecting the device. The apparatus 50 may further comprise a display 32, for example, in the form of a liquid crystal display, light emitting diode display, organic light emitting diode display, and the like. In other embodiments of the examples described herein the display may be any suitable display technology suitable to display media or multimedia content, for example, an image or a video. The apparatus 50 may further comprise a keypad 34. In other embodiments of the examples described herein any suitable data or user interface mechanism may be employed. For example, the user interface may be implemented as a virtual keyboard or data entry system as part of a touch-sensitive display.

The apparatus may comprise a microphone 36 or any suitable audio input which may be a digital or analogue signal input. The apparatus 50 may further comprise an audio output device which in embodiments of the examples described herein may be any one of: an earpiece 38, speaker, or an analogue audio or digital audio output connection. The apparatus 50 may also comprise a battery (or in other embodiments of the examples described herein the device may be powered by any suitable mobile energy device such as solar cell, fuel cell or clockwork generator). The apparatus may further comprise a camera capable of recording or capturing images and/or video. The apparatus 50 may further comprise an infrared port for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56, a processor or a processor circuitry for controlling the apparatus 50. The controller 56 may be connected to a memory 58 which in embodiments of the examples described herein may store both data in the form of an image, audio data, video data, and/or may also store instructions for implementation on the controller 56. The controller 56 may further be connected to codec circuitry 54 suitable for carrying out coding and/or decoding of audio, image, and/or video data or assisting in coding and/or decoding carried out by the controller.

The apparatus 50 may further comprise a card reader 48 and a smart card 46, for example, a UICC and UICC reader for providing user information and being suitable for providing authentication information for authentication and authorization of the user at a network.

The apparatus 50 may comprise radio interface circuitry 52 connected to the controller and suitable for generating wireless communication signals, for example, for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and/or for receiving radio frequency signals from other apparatus(es).

The apparatus 50 may comprise a camera 42 capable of recording or detecting individual frames which are then passed to the codec 54 or the controller for processing. The apparatus may receive the video image data for processing from another device prior to transmission and/or storage. The apparatus 50 may also receive either wirelessly or by a wired connection the image for coding/decoding. The structural elements of apparatus 50 described above represent examples of means for performing a corresponding function.

Figure 3:
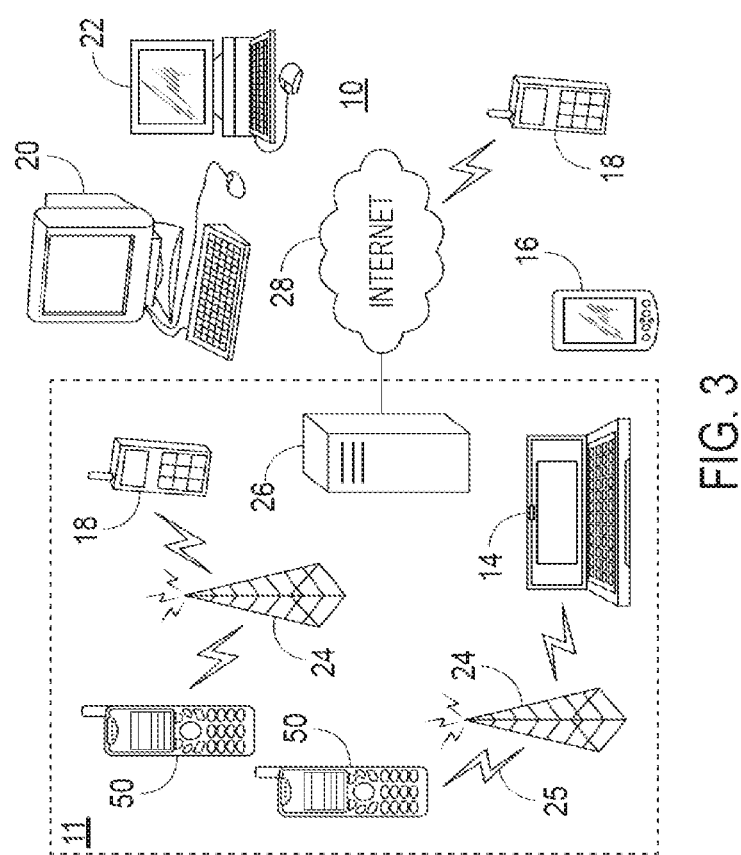
FIG. 3 further shows schematically electronic devices employing embodiments of the examples described herein connected using wireless and wired network connections.

With respect to FIG. 3, an example of a system within which embodiments of the examples described herein can be utilized is shown. The system 10 comprises multiple communication devices which can communicate through one or more networks. The system 10 may comprise any combination of wired or wireless networks including, but not limited to, a wireless cellular telephone network (such as a GSM, UMTS, CDMA, LTE, 4G, 5G network, and the like), a wireless local area network (WLAN) such as defined by any of the IEEE 802.x standards, a Bluetooth® personal area network, an Ethernet local area network, a token ring local area network, a wide area network, and the Internet.

The system 10 may include both wired and wireless communication devices and/or apparatus 50 suitable for implementing embodiments of the examples described herein.

For example, the system shown in FIG. 3 shows a mobile telephone network 11 and a representation of the Internet 28. Connectivity to the Internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

The embodiments may also be implemented in a set-top box; for example, a digital TV receiver, which may/may not have a display or wireless capabilities, in tablets or (laptop) personal computers (PC), which have hardware and/or software to process neural network data, in various operating systems, and in chipsets, processors, DSPs and/or embedded systems offering hardware/software based coding.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, 3GPP Narrowband IoT and any similar wireless communication technology. A communications device involved in implementing various embodiments of the examples described herein may communicate using various media including, but not limited to, radio, infrared, laser, cable connections, and any suitable connection.

In telecommunications and data networks, a channel may refer either to a physical channel or to a logical channel. A physical channel may refer to a physical transmission medium such as a wire, whereas a logical channel may refer to a logical connection over a multiplexed medium, capable of conveying several logical channels. A channel may be used for conveying an information signal, for example a bitstream, from one or several senders (or transmitters) to one or several receivers.

The embodiments may also be implemented in internet of things (IoT) devices. The IoT may be defined, for example, as an interconnection of uniquely identifiable embedded computing devices within the existing Internet infrastructure. The convergence of various technologies has and may enable many fields of embedded systems, such as wireless sensor networks, control systems, home/building automation, and the like, to be included the IoT. In order to utilize the Internet, IoT devices are provided with an IP address as a unique identifier. The IoT devices may be provided with a radio transmitter, such as WLAN or Bluetooth® transmitter or an RFID tag. Alternatively, IoT devices may have access to an IP-based network via a wired network, such as an Ethernet-based network or a power-line connection (PLC).

The devices/systems described in FIGS. 1 to 3 encoding, decoding, signalling, and/or transporting of an image file format, in accordance with various embodiments.

An MPEG-2 transport stream (TS), specified in ISO/IEC 13818-1 or equivalently in ITU-T Recommendation H.222.0, is a format for carrying audio, video, and other media as well as program metadata or other metadata, in a multiplexed stream. A packet identifier (PID) is used to identify an elementary stream (a.k.a. packetized elementary stream) within the TS. Hence, a logical channel within an MPEG-2 TS may be considered to correspond to a specific PID value.

Available media file format standards include ISO base media file format (ISO/IEC 14496-12, which may be abbreviated ISOBMFF) and file format for NAL unit structured video (ISO/IEC 14496-15), which derives from the ISOBMFF.

Video codec includes an encoder that transforms the input video into a compressed representation suited for storage/transmission and a decoder that can decompress the compressed video representation back into a viewable form. A video encoder and/or a video decoder may also be separate from each other, for example, need not form a codec. Typically, encoder discards some information in the original video sequence in order to represent the video in a more compact form (e.g., at lower bitrate).

Typical hybrid video encoders, for example, many encoder implementations of ITU-T H.263 and H.264, encode the video information in two phases. Firstly pixel values in a certain picture area (or 'block') are predicted, for example, by motion compensation means (finding and indicating an area in one of the previously coded video frames that corresponds closely to the block being coded) or by spatial means (using the pixel values around the block to be coded in a specified manner). Secondly the prediction error, for example, the difference between the predicted block of pixels and the original block of pixels, is coded. This is typically done by transforming the difference in pixel values using a specified transform (for example, Discrete Cosine Transform (DCT) or a variant of it), quantizing the coefficients and entropy coding the quantized coefficients. By varying the fidelity of the quantization process, encoder can control the balance between the accuracy of the pixel representation (picture quality) and size of the resulting coded video representation (file size or transmission bitrate).

In temporal prediction, the sources of prediction are previously decoded pictures (a.k.a. reference pictures). In intra block copy (IBC; a.k.a. intra-block-copy prediction and current picture referencing), prediction is applied similarly to temporal prediction but the reference picture is the current picture and only previously decoded samples can be referred in the prediction process. Inter-layer or inter-view prediction may be applied similarly to temporal prediction, but the reference picture is a decoded picture from another scalable layer or from another view, respectively. In some cases, inter prediction may refer to temporal prediction only, while in other cases inter prediction may refer collectively to temporal prediction and any of intra block copy, inter-layer prediction, and inter-view prediction provided that they are performed with the same or similar process than temporal prediction. Inter prediction or temporal prediction may sometimes be referred to as motion compensation or motion-compensated prediction.

Inter prediction, which may also be referred to as temporal prediction, motion compensation, or motion-compensated prediction, reduces temporal redundancy. In inter prediction the sources of prediction are previously decoded pictures. Intra prediction utilizes the fact that adjacent pixels within the same picture are likely to be correlated. Intra prediction can be performed in spatial or transform domain, for example, either sample values or transform coefficients can be predicted. Intra prediction is typically exploited in intra coding, where no inter prediction is applied.

One outcome of the coding procedure is a set of coding parameters, such as motion vectors and quantized transform coefficients. Many parameters can be entropy-coded more efficiently when they are predicted first from spatially or temporally neighboring parameters. For example, a motion vector may be predicted from spatially adjacent motion vectors and only the difference relative to the motion vector predictor may be coded. Prediction of coding parameters and intra prediction may be collectively referred to as in-picture prediction.

Figure 4:
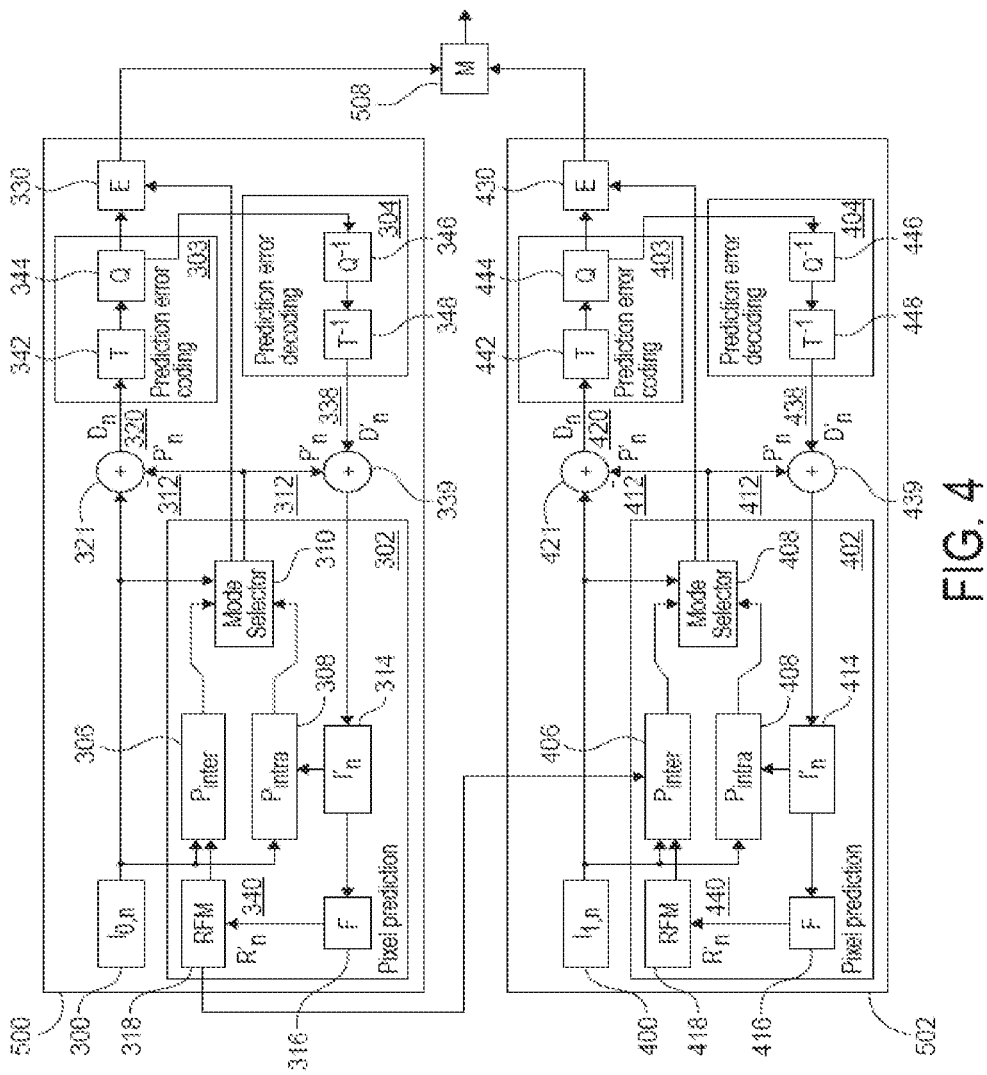
FIG. 4 shows schematically a block diagram of an encoder on a general level.

FIG. 4 shows a block diagram of a general structure of a video encoder. FIG. 4 presents an encoder for two layers, but it would be appreciated that presented encoder could be similarly extended to encode more than two layers. FIG. 4 illustrates a video encoder comprising a first encoder section 500 for a base layer and a second encoder section 502 for an enhancement layer. Each of the first encoder section 500 and the second encoder section 502 may comprise similar elements for encoding incoming pictures. The encoder sections 500, 502 may comprise a pixel predictor 302, 402, prediction error encoder 303, 403 and prediction error decoder 304, 404. FIG. 4 also shows an embodiment of the pixel predictor 302, 402 as comprising an inter-predictor 306, 406, an intra-predictor 308, 408, a mode selector 310, 410, a filter 316, 416, and a reference frame memory 318, 418. The pixel predictor 302 of the first encoder section 500 receives base layer image(s) 300 of a video stream to be encoded at both the inter-predictor 306 (which determines the difference between the image and a motion compensated reference frame) and the intra-predictor 308 (which determines a prediction for an image block based only on the already processed parts of current frame or picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the base layer image 300. Correspondingly, the pixel predictor 402 of the second encoder section 502 receives enhancement layer image(s) 400 of a video stream to be encoded at both the inter-predictor 406 (which determines the difference between the image and a motion compensated reference frame) and the intra-predictor 408 (which determines a prediction for an image block based only on the already processed parts of current frame or picture). The output of both the inter-predictor and the intra-predictor are passed to the mode selector 410. The intra-predictor 408 may have more than one intra-prediction modes. Hence, each mode may perform the intra-prediction and provide the predicted signal to the mode selector 410. The mode selector 410 also receives a copy of the enhancement layer picture 400.

Depending on which encoding mode is selected to encode the current block, the output of the inter-predictor 306, 406 or the output of one of the optional intra-predictor modes or the output of a surface encoder within the mode selector is passed to the output of the mode selector 310, 410. The output of the mode selector 310, 410 is passed to a first summing device 321, 421. The first summing device may subtract the output of the pixel predictor 302, 402 from the base layer image 300 or the enhancement layer image 400 to produce a first prediction error signal 320, 420 which is input to the prediction error encoder 303, 403.

The pixel predictor 302, 402 further receives from a preliminary reconstructor 339, 439 the combination of the prediction representation of the image block 312, 412 and the output 338, 438 of the prediction error decoder 304, 404. The preliminary reconstructed image 314, 414 may be passed to the intra-predictor 308, 408 and to a filter 316, 416. The filter 316, 416 receiving the preliminary representation may filter the preliminary representation and output a final reconstructed image 340, 440 which may be saved in a reference frame memory 318, 418. The reference frame memory 318 may be connected to the inter-predictor 306 to be used as the reference image against which a future base layer image 300 is compared in inter-prediction operations. Subject to the base layer being selected and indicated to be source for inter-layer sample prediction and/or inter-layer motion information prediction of the enhancement layer according to some embodiments, the reference frame memory 318 may also be connected to the inter-predictor 406 to be used as the reference image against which a future enhancement layer images 400 is compared in inter-prediction operations. Moreover, the reference frame memory 418 may be connected to the inter-predictor 406 to be used as the reference image against which a future enhancement layer image 400 is compared in inter-prediction operations.

Filtering parameters from the filter 316 of the first encoder section 500 may be provided to the second encoder section 502 subject to the base layer being selected and indicated to be source for predicting the filtering parameters of the enhancement layer according to some embodiments.

The prediction error encoder 303, 403 comprises a transform unit 342, 442 and a quantizer 344, 444. The transform unit 342, 442 transforms the first prediction error signal 320, 420 to a transform domain. The transform is, for example, the DCT transform. The quantizer 344, 444 quantizes the transform domain signal, for example, the DCT coefficients, to form quantized coefficients.

The prediction error decoder 304, 404 receives the output from the prediction error encoder 303, 403 and performs the opposite processes of the prediction error encoder 303, 403 to produce a decoded prediction error signal 338, 438 which, when combined with the prediction representation of the image block 312, 412 at the second summing device 339, 439, produces the preliminary reconstructed image 314, 414.

The prediction error decoder may be considered to comprise a dequantizer 346, 446, which dequantizes the quantized coefficient values, for example, DCT coefficients, to reconstruct the transform signal and an inverse transformation unit 348, 448, which performs the inverse transformation to the reconstructed transform signal wherein the output of the inverse transformation unit 348, 448 contains reconstructed block(s). The prediction error decoder may also comprise a block filter which may filter the reconstructed block(s) according to further decoded information and filter parameters.

The entropy encoder 330, 430 receives the output of the prediction error encoder 303, 403 and may perform a suitable entropy encoding/variable length encoding on the signal to provide error detection and correction capability. The outputs of the entropy encoders 330, 430 may be inserted into a bitstream, for example, by a multiplexer 508.

Figure 5:
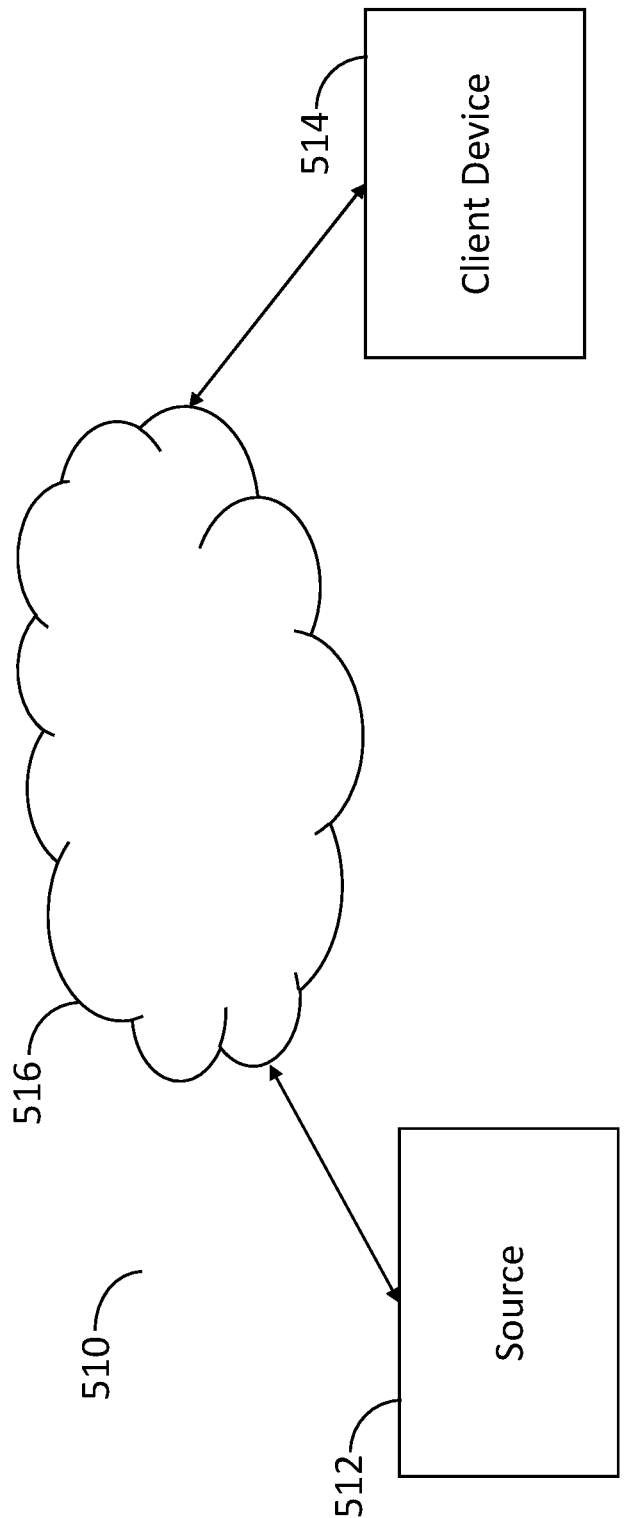
FIG. 5 illustrates a system configured to support streaming of media data from a source to a client device.

The method and apparatus of an example embodiment may be utilized in a wide variety of systems, including systems that rely upon the compression and decompression of media data and possibly also the associated metadata. In one embodiment, however, the method and apparatus are configured to compress the media data and associated metadata streamed from a source via a content delivery network to a client device, at which point the compressed media data and associated metadata is decompressed or otherwise processed. In this regard, FIG. 5 depicts an example of such a system 510 that includes a source 512 of media data and associated metadata. The source may be, in one embodiment, a server. However, the source may be embodied in other manners when desired. The source is configured to stream the media data and associated metadata to the client device 514. The client device may be embodied by a media player, a multimedia system, a video system, a smart phone, a mobile telephone or other user equipment, a personal computer, a tablet computer or any other computing device configured to receive and decompress the media data and process associated metadata. In the illustrated embodiment, media data and metadata are streamed via a network 516, such as any of a wide variety of types of wireless networks and/or wireline networks. The client device is configured to receive structured information containing media, metadata and any other relevant representation of information containing the media and the metadata and to decompress the media data and process the associated metadata (e.g. for proper playback timing of decompressed media data).

Figure 6:
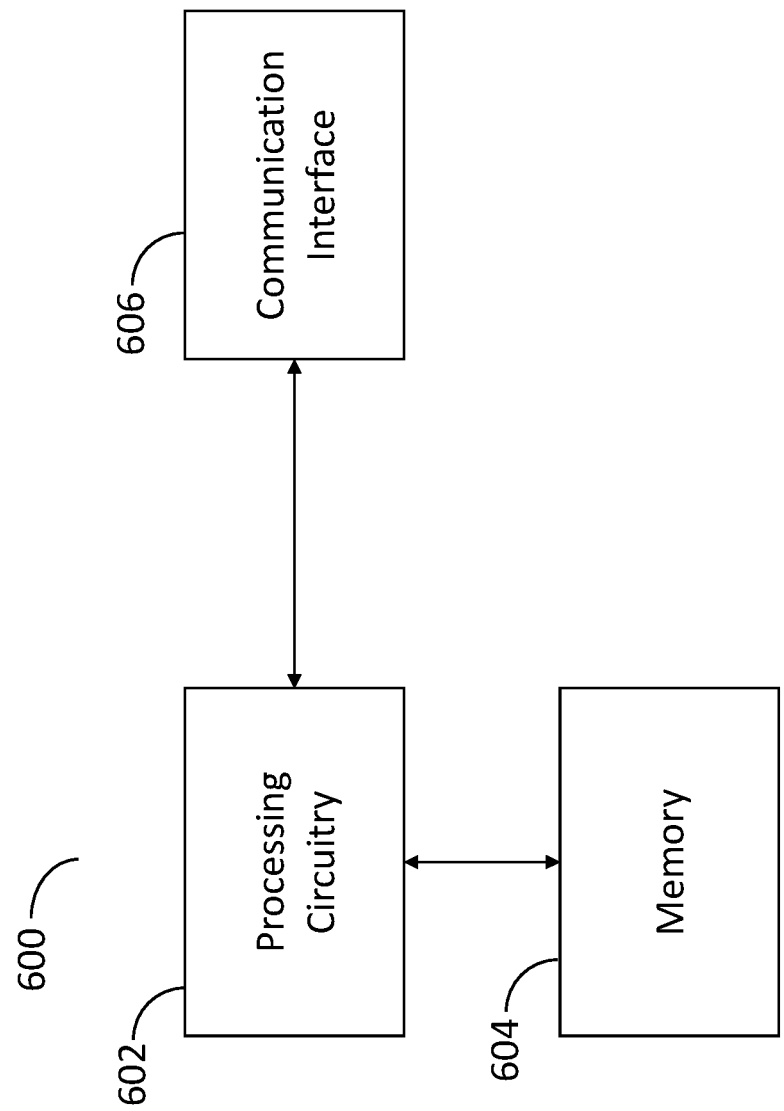
FIG. 6 is a block diagram of an apparatus that may be specifically configured in accordance with an example embodiment.

An apparatus 600 is provided in accordance with an example embodiment as shown in FIG. 6. In one embodiment, the apparatus of FIG. 6 may be embodied by the source 512, such as a file writer which, in turn, may be embodied by a server, that is configured to stream a compressed representation of the media data and associated metadata. In an alternative embodiment, the apparatus may be embodied by a client device 514, such as a file reader which may be embodied, for example, by any of the various computing devices described above. In either of these embodiments and as shown in FIG. 6, the apparatus of an example embodiment is associated with or is in communication with a processing circuitry 602, one or more memory devices 604, a communication interface 606, and optionally a user interface.

The processing circuitry 602 may be in communication with the memory device 604 via a bus for passing information among components of the apparatus 600. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 600 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 602 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 602 may be configured to execute instructions stored in the memory device 604 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processing circuitry to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 606 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, the apparatus 600 may optionally include a user interface that may, in turn, be in communication with the processing circuitry 602 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device, and/or the like).

ISO Base Media File Format

Available media file format standards include International Standards Organization (ISO) base media file format (ISOBMFF), Moving Picture Experts Group (MPEG)-4 file format, file format for network abstraction layer (NAL) unit structured video, and high efficiency video coding standard (HEVC or H.265/HEVC).

Some concepts, structures, and specifications of ISOBMFF are described below as an example of a container file format, based on which some embodiments may be implemented. The aspects of the disclosure are not limited to ISOBMFF, but rather the description is given for one possible basis on top of which at least some embodiments may be partly or fully realized.

A basic building block in the ISO base media file format is called a box. Each box has a header and a payload. The box header indicates the type of the box and the size of the box in terms of bytes. Box type is typically identified by an unsigned 32-bit integer, interpreted as a four character code (4CC). A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit.

A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g., VisualSampleEntry, AudioSampleEntry). Which type of sample entry form is used for derivation of the track-type specific sample entry format is determined by the media handler of the track.

The track reference mechanism can be used to associate tracks with each other. The TrackReferenceBox includes box(es), each of which provides a reference from the containing track to a set of other tracks. These references are labeled through the box type (e.g., the four-character code of the box) of the contained box (es).

The ISO base media file format contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as the advanced video coding (AVC) file format and the scalable video coding (SVC) file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g. to indicate a sub-type of the grouping.

In ISOMBFF, an edit list provides a mapping between the presentation timeline and the media timeline. Among other things, an edit list provides for the linear offset of the presentation of samples in a track, provides for the indication of empty times and provides for a particular sample to be dwelled on for a certain period of time. The presentation timeline may be accordingly modified to provide for looping, such as for the looping videos of the various regions of the scene. One example of the box that includes the edit list, the EditListBox, is provided below:

```
aligned(8) class EditListBox extends FullBox('elst', version,
flags) {
unsigned int(32) entry_count;
    for (i=1; i <= entry_count; i++) {
        if (version==1) {
            unsigned int(64) segment_duration;
            int(64) media_time;
        } else { // version==0
            unsigned int(32) segment_duration;
            int(32) media_time;
        }
        int(16) media_rate_integer;
        int(16) media_rate_fraction = 0;
    }
}
```

In ISOBMFF, an EditListBox may be contained in EditBox, which is contained in TrackBox ('trak').

In this example of the edit list box, flags specify the repetition of the edit list. By way of example, setting a specific bit within the box flags (the least significant bit, e.g., flags & 1 in ANSI-C notation, where & indicates a bit-wise AND operation) equal to 0 specifies that the edit list is not repeated, while setting the specific bit (e.g., flags & 1 in ANSI-C notation) equal to 1 specifies that the edit list is repeated. The values of box flags greater than 1 may be defined to be reserved for future extensions. As such, when the edit list box indicates the playback of zero or one samples, (flags & 1) shall be equal to zero. When the edit list is repeated, the media at time 0 resulting from the edit list follows immediately the media having the largest time resulting from the edit list such that the edit list is repeated seamlessly.

In ISOBMFF, a Track group enables grouping of tracks based on certain characteristics or the tracks within a group have a particular relationship. Track grouping, however, does not allow any image items in the group.

The syntax of TrackGroupBox in ISOBMFF is as follows:

```
aligned(8) class TrackGroupBox extends Box('trgr') {
}
aligned(8) class TrackGroupTypeBox(unsigned int(32)
track_group_type) extends FullBox(track_group_type, version =
0, flags = 0)
{
unsigned int(32) track_group_id;
// the remaining data may be specified for a particular
track_group_type
}
``` track_group_type indicates the grouping_type and shall be set to one of the following values, or a value registered, or a value from a derived specification or registration: 'msrc' indicates that this track belongs to a multi-source presentation. The tracks that have the same value of track_group_id within a TrackGroupTypeBox of track_group_type 'msrc' are mapped as being originated from the same source. For example, a recording of a video telephony call may have both audio and video for both participants, and the value of track_group_id associated with the audio track and the video track of one participant differs from value of track_group_id associated with the tracks of the other participant.

The pair of track_group_id and track_group_type identifies a track group within the file. The tracks that contain a particular TrackGroupTypeBox having the same value of track_group_id and track_group_type belong to the same track group.

The Entity grouping is similar to track grouping but enables grouping of both tracks and image items in that same group.

The syntax of EntityToGroupBox in ISOBMFF is as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
}
``` group_id is a non-negative integer assigned to the particular grouping that shall not be equal to any group_id value of any other EntityToGroupBox, any item_ID value of the hierarchy level (file, movie, or track) that contains the GroupsListBox, or any track_ID value (when the GroupsListBox is contained in the file level).

num_entities_in_group specifies the number of entity_id values mapped to this entity group.

entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Files conforming to the ISOBMFF may contain any non-timed objects, referred to as items, meta items, or metadata items, in a meta box (four-character code: 'meta'). While the name of the meta box refers to metadata, items can generally contain metadata or media data. The meta box may reside at the top level of the file, within a movie box (four-character code: 'moov'), and within a track box (four-character code: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and are uniquely identified with the file by item identifier (item_id) which is an integer value. The metadata items may be for example stored in the 'idat' box of the meta box or in an 'mdat' box or reside in a separate file. If the metadata is located external to the file then its location may be declared by the DataInformationBox (four-character code: 'dinf'). In the specific case that the metadata is formatted using eXtensible Markup Language (XML) syntax and is required to be stored directly in the MetaBox, the metadata may be encapsulated into either the XMLBox (four-character code: 'xml') or the BinaryXMLBox (four-character code: 'bxml'). An item may be stored as a contiguous byte range, or it may be stored in several extents, each being a contiguous byte range. In other words, items may be stored fragmented into extents, e.g. to enable interleaving. An extent is a contiguous subset of the bytes of the resource. The resource can be formed by concatenating the extents.

The ItemPropertiesBox enables the association of any item with an ordered set of item properties. Item properties may be regarded as small data records. The ItemPropertiesBox consists of two parts: ItemPropertyContainerBox that contains an implicitly indexed list of item properties, and one or more ItemPropertyAssociationBox(es) that associate items with item properties.

High Efficiency Image File Format (HEIF)

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises still images that are stored as items and image sequences that are stored as tracks.

In the context of HEIF, the following boxes may be contained within the root-level 'meta' box and may be used as described in the following. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. When there is an item among a collection of items that is in some way to be considered the most important compared to others, this item is signaled by the Primary Item ('pitm') box. Apart from the boxes mentioned here, the 'meta' box is also flexible to include other boxes that may be necessary to describe items.

Any number of image items can be included in the same file. Given a collection of images stored by using the 'meta' box approach, it sometimes is essential to qualify certain relationships between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

Region Items and Region Annotations

Region Item

Definition

An item with an item_type value of 'rgan' defines one or more regions of an image.

The region item may allow associating a same set of item properties or other items or both with each individual region it defines inside an image. But item properties should only be associated with a region item when the property value for the region differs from the matching (explicit or implied) property value for the base image.

The region item is associated with the image item in which the regions are defined using an item reference of type 'cdsc' from the region item to the image item.

The geometries of the regions described by the region item are specified in the data of the item. These geometries define the shape, position and size of the regions inside a reference space that is mapped to the image item with which the region item is associated before any transformative property is applied to the image item.

The reference space is defined as a 2D coordinate system with the origin (0,0) located at the top-left corner and a maximum size defined by reference_width and reference_height; the x-axis is oriented from left to right and the y-axis from top to bottom. Geometry of the regions inside the associated image item are the values after applying the implicit resampling caused by the difference between the size of the reference space and the size of the image item.

The geometry of a region described by the region item can be represented either by a point, a rectangle, an ellipse, a polygon, a mask stored in an image item or a mask declared in the data of the region item.

The pixels of an image item that are part of a region depends on the geometry of the region. When the geometry of a region is represented by a point, the pixel located at this point, if it exists, is part of the region. When the geometry of a region is represented by a rectangle, an ellipse, or a polygon, the pixels that are inside (including the boundary) of the rectangle, ellipse, or polygon are part of the region. When the geometry of a region is represented as a mask, the pixels of the image item corresponding to pixels with a 0 value in the mask image are part of the region.

In an embodiment, a region may be empty when it falls entirely outside the image. An empty region should be ignored.

When the geometry of a region is represented by a mask stored in an image item (e.g., when geometry_type equals 4), the item containing the mask shall be identified by an item reference of type 'mask' from the region item to the item containing the mask. When a region item describes several regions represented by a mask stored in an image item, there shall be one reference for each such region inside the item reference of type 'mask'. The Nth reference in the item reference of type 'mask' identifies the mask for the Nth region with geometry_type equals to 4, in declaration order, in the region item.

In an embodiment, when the same mask stored as an image item is used for multiple regions declared in a region item, this image item will be referenced several times in the item reference of type 'mask'.

In an embodiment, when the mask is stored as an image item, transformative item properties may apply to the mask before it applies to the referenced image item.

Syntax

```
aligned (8) class RegionItem {
    unsigned int(8) version = 0;
    unsigned int(8) flags;
    field_size = ((flags & 1) + 1) * 16;
    unsigned int(field_size) reference_width;
    unsigned int(field_size) reference_height;
    unsigned int(8) region_count;
    for (r=0; r < region_count; r++) {
        unsigned int(8) geometry_type;
        if (geometry_type == 0) {
            // point
            signed int(field_size) x;
            signed int(field_size) y;
        }
        else if (geometry_type == 1) {
            // rectangle
            signed int(field_size) x;
            signed int(field_size) y;
            unsigned int(field_size) width;
            unsigned int(field_size) height;
        }
        else if (geometry_type == 2) {
            // ellipse
            signed int(field_size) x;
            signed int(field_size) y;
            unsigned int(field_size) radius_x;
            unsigned int(field_size) radius_y;
        }
        else if (geometry_type == 3) {
            // polygon
            unsigned int(field size) point_count;
            for (i=0; i < point_count; i++) {
                signed int(field_size) px;
                signed int(field_size) py;
            }
        }
        else if (geometry_type == 4) {
            // referenced mask
            signed int(field_size) x;
            signed int(field_size) y;
        }
        else if (geometry_type == 5) {
            // inline mask
            signed int(field_size) x;
            signed int(field_size) y;
            unsigned int(field_size) width;
            unsigned int(field_size) height;
            unsigned int(8) bits_per_pixel;
            bit(8) data[ ];
        }
    }
}
```

Semantics version shall be equal to 0.

(flags & 1) equal to 0 specifies that the length of the fields x, y, width, height, radius_x, radius_y, point_count, px, and py is 16 bits. (flags & 1) equal to 1 specifies that the length of the fields x, y, width, height, radius_x, radius_y, point_count, px, and py is 32 bits. The values of flags greater than 1 are reserved.

reference_width, reference_height specify the width and height, respectively, of the reference space on which the regions are placed.

geometry_type specifies the type of the geometry of a region. The following values for geometry_type are specified:
 0: the region is described as a point.
 1: the region is described as a rectangle.
 2: the region is described as an ellipse.
 3: the region is described as a polygon.
 4: the region is described as a mask defined in a referenced image item.
 5: the region is described as a mask defined inside the data of the region item.
 Other values are reserved.

x, y specify the coordinates of the region when its geometry is a point. x, y specify the top, left corner of the region when its geometry is a rectangle or a mask. x, y specify the centre of the region when its geometry is an ellipse. Negative values for the x or y fields enable to specify points, top-left corners, and/or centres that are outside the image. This may be useful for updating region annotations during the edition of an HEIF file.

width, height specify the width and the height of the region when its geometry is a rectangle or an inline mask.

radius_x specifies the radius on x-axis of the region when its geometry is an ellipse.

radius_y specifies the radius on y-axis of the region when its geometry is an ellipse.

point_count is the number of points contained in a polygon.

A polygon specifying the geometry of a region is always closed and therefore there is no need to repeat the first point of the polygon as the ending point of the polygon.

px, py specify the coordinates of the points composing the polygon.

bits_per_pixel provides the number of bits per pixel. It shall be 1, 8, 16, 24. Other values are reserved.

Specifying a mask with more than 1 bit per pixel enables to use an alpha-plane layer as a mask.

data contains the pixels for an inline mask in raster-scan order. When bits_per_pixel equals 1, 8 pixels are packed in one byte. No padding shall be put at the end of each line if the mask width is not a multiple of 8 pixels. Only the last data byte shall be padded.

Region Annotation

A region annotation includes metadata or image items associated with one or more regions of an image item.

A region annotation may be associated with one or more regions of an image item by:
  describing in a region item the geometry of these one or more regions;
  associating the region item with the image item it describes using the 'cdsc' (content describes) item reference from the region item to the image item; and
  associating any or all of the following with the region item:
    descriptive image properties, using the ItemPropertyAssociationBox. In an embodiment, a region annotation may use a UserDescriptionProperty to associate a description/tags with a region of an image item;
    metadata items, using an item reference of type 'cdsc' from the metadata item to the region item; or
    image items or an entity group, using an item reference of type 'eroi' from the region item to the image item or entity group.

The region annotation applies to a region or each region described in the region item individually.

The same region annotation may be associated with several image items by associating the same region item with multiple image items.

A region item is a new item which is introduced in HEIF. It enables storage of region information which maps to a particular area of the image. Such regions may have regular or irregular shapes. Irregular shapes may be defined by using a 'mask'.

Current syntax structure enables signaling of mask by referencing an image item which can be used as a mask by inline storage of the mask data inside a RegionItem metadata structure.

Since the inline-stored mask data is a raw data, its size may become considerably large. This makes the HEIF metadata unnecessarily large and can cause unnecessary delays or processing complexities during accessing images inside a HEIF file.

Various embodiments provide at least following approaches to reduce this data size:

Lossless-compress the mask data by using readily available compressing tools such as ZLIB and DEFLATE. The compressed mask data may still be stored inline the RegionItem data structure.

Define a new item (a mask item) which then stores the losslessly-compressed mask data as media data and is explicitly referenced by item reference of type 'mask'.

Various embodiments also provide necessary syntax elements for signaling and configuring region masks and store them efficiently in image file format file, for example, HEIF files.

In order to introduce an efficient storage of masks, RegionItem data structure is extended by various embodiments as follows:

```
aligned (8) class RegionItem {
  unsigned int(8) version = 0;
  unsigned int(8) flags;
  field_size = ((flags & 1) + 1) * 16;
  unsigned int(field_size) reference_width;
  unsigned int(field_size) reference_height;
  unsigned int(8) region_count;
  for (r=0; r < region_count; r++) {
    unsigned int(8) geometry_type;
    if (geometry_type == 0) {
      // point
      signed int(field_size) x;
      signed int(field_size) y;
    }
    else if (geometry_type == 1) {
      // rectangle
      signed int(field_size) x;
      signed int(field_size) y;
      unsigned int(field_size) width;
      unsigned int(field_size) height;
    }
    else if (geometry_type == 2) {
      // ellipse
      signed int(field_size) x;
      signed int(field_size) y;
      unsigned int(field_size) radius_x;
      unsigned int(field_size) radius_y;
    }
    else if (geometry_type == 3) {
      // polygon
      unsigned int(field size) point_count;
      for (i=0; i < point_count; i++) {
        signed int(field_size) px;
        signed int(field_size) py;
      }
    }
    else if (geometry_type == 4) {
      // referenced mask
      signed int(field_size) x;
      signed int(field_size) y;
    }
    else if (geometry_type == 5) {
      // inline mask option 1
      signed int(field_size) x;
      signed int(field_size) y;
      unsigned int(field_size) width;
      unsigned int(field_size) height;
      unsigned int(8) bits_per_pixel;
      unsigned int(8) cell_size;
      unsigned int(8) mask_coding_method;
      unsigned int(32) mask_coding_parameters;
      bit(8) data[ ];
    }
    else if(geometry_type == 6) {
      // inline mask option 2
      signed int(field_size) x;
      signed int(field_size) y;
      MaskConfigurationStruct mask_configuration;
      unsigned int(32) mask_coding_parameters;
      bit(8) data [ ];
    }
}
```

The following semantics explain one or more syntax elements proposed by various embodiment:
   cell_size indicates the dimensions of a region, of M×N pixels, including a mask value, where M indicates the horizontal and N indicates the vertical number of pixels. Their values can be 1, 2, 4 or 8. In an embodiment, M=(cell_size>>4) & 0x0F and N=cell_size & 0x0F.

A cell size of M×N indicates that M×N pixels are represented by one mask value. For example, a cell size of 2×2 indicates that there is a single mask value which applies to all the pixels of a 2×2 grid. In such a case, the number of bits in the mask shall be equal to bits_per_pixel*(width*height)/(cell_size). This division shall result in an integer value.
   mask_coding_method indicates the coding method that is applied on the data. The following values may be specified:
      0: No mask encoding scheme applied
      1: DEFLATE compressed data
      2: ZLIB compressed data
      other values: reserved
   mask_coding_parameters indicate additional encoding or decoding parameters needed for successfully processing the coded mask data.
   when mask_coding_method is:
      1 or 2: mask_coding_parameters indicate the number of bytes in the coded mask array data[ ].
      other values: reserved
   data contains the coded (DEFLATE or ZLIB) representation of a mask that may include the pixels for an inline mask in raster-scan order. bits_per_pixel and byte packing may be defined as follows:
      when bits_per_pixel equals to 1, 2 or 4; pixels or cells (with dimension M×N pixels) packed per byte are 8, 4 or 2, respectively. Byte packing may be in big-endian order. In another embodiment, byte packing may be in little-endian or mixed-endian order. No padding shall be put at the end of each line when the mask width is not a multiple of 8 pixels. Only the last data byte shall be padded.
      when bits_per_pixel equals to 8, 16 or 24; the mask value of a pixel or a cell (with dimension M×N pixels) is represented with 1, 2 or 3 bytes, respectively. Bytes of a pixel or the cell (with dimension M×N pixels) may be serialized starting from the most significant byte. In another embodiment, bytes of a pixel or the cell (with dimension M×N pixels) may be serialized starting from the least significant byte.
   mask_configuration includes the mask related information as a MaskConfigurationStruct.
   MaskConfigurationStruct is described in following paragraphs along with a mask item syntax.

In another embodiment, masks are introduced as HEIF items. At least one advantage of such an approach is to enable storage of the mask data in the media data part of the HEIF file, rather than together with the metadata. Moreover, all necessary configuration data for a mask can be collected together and/or reused by different region items.

Mask Item

Definition

An item with an item_type value of 'mski' defines a mask. A mask may be associated with a region item to define a mask for a particular region that is defined by the region item.

A mask item comprises a defined width and height in pixels. A mask item data represents a compressed or uncompressed series of bits where each bit corresponds to a pixel or group of pixels.

The width and height of the mask item shall be signalled using the image spatial extends ('ispe') property.

Mask specific configuration and compression information may be stored in MaskConfigurationProperty.

Mask data includes the coded (e.g. DEFLATE or ZLIB) representation of a mask that includes the pixels for an inline mask in raster-scan order. bits_per_pixel and byte packing are defined as follows:
   when bits_per_pixel of MaskConfigurationProperty equals to 1, 2 or 4; pixels or cells (with dimension M×N pixels) packed per byte are 8, 4 or 2, respectively. Byte packing may be in big-endian order. No padding shall be put at the end of each line when the mask width is not a multiple of 8 pixels, but only the last data byte shall be padded. For example, when the number of bits required to represent a mask, as calculated with the formula bits_per_pixel*(width*height)/(cell_size) is not a multiple of 8, in such a case, the last byte may have padding bits and the formula tells us how many bits are padded.
   when bits_per_pixel of MaskConfigurationProperty equals to 8, 16 or 24; the mask value of a pixel or cells (with dimension M×N pixels) is represented with 1, 2 or 3 bytes, respectively. Bytes of a pixel may be serialized starting from the most significant byte.

Mask Configuration Property

A mask item's configuration information may be stored as a property and get associated with the mask item. The following syntax and definition define such a configuration property.

Definition

Box type: 'mskc'
Property type: Descriptive item property
Container: ItemPropertyContainerBox
Mandatory (per item): Yes for mask items
Quantity (per item): One The MaskConfigurationProperty provides information required to generate the mask item.

Syntax

```
aligned(8) class MaskConfigurationProperty
extends ItemFullProperty('bmsp', version = 0, flags = 0){
  MaskConfigurationStruct;
}
aligned (8) class MaskConfigurationStruct {
  unsigned int(8) flags;
  field_size = ((flags & 1) + 1) * 16;
  unsigned int(field_size) width;
  unsigned int(field_size) height;
  unsigned int(8) bits_per_pixel;
  unsigned int(8) cell_size;
  unsigned int(8) mask_coding_method;
}
```

Semantics
   (flags & 1) equal to 0 specifies that the length of the fields width and height is 16 bits.
   (flags & 1) equal to 1 specifies that the length of the fields width and height is 32 bits.
   The values of flags greater than 1 are reserved.
   width specifies the width of the mask in pixels.
   height specifies the height of the mask in pixels.

bits_per_pixel provides the number of bits per pixel. It shall be 1, 2, 4, 8, 16 or 24. Other values are reserved.

cell_size indicates the dimensions of a region, of M×N pixels, including a mask value, where M indicates the horizontal and N indicates the vertical number of pixels. Their values can be 1, 2, 4 or 8. In an embodiment, M=(cell_size>>4) & 0x0F and N=cell_size & 0x0F.

A cell size of M×N indicates that M×N pixels are represented by one mask value. For example, a cell size of 2×2 indicates that there is a single mask value which applies to all the pixels of a 2×2 grid. In such a case, the number of bits in the mask shall be equal to bits_per_pixel*(width*height)/(cell_size). This division shall result in an integer value.

mask_data_encoding_method indicates the coding method applied on the data.

Figure 7:
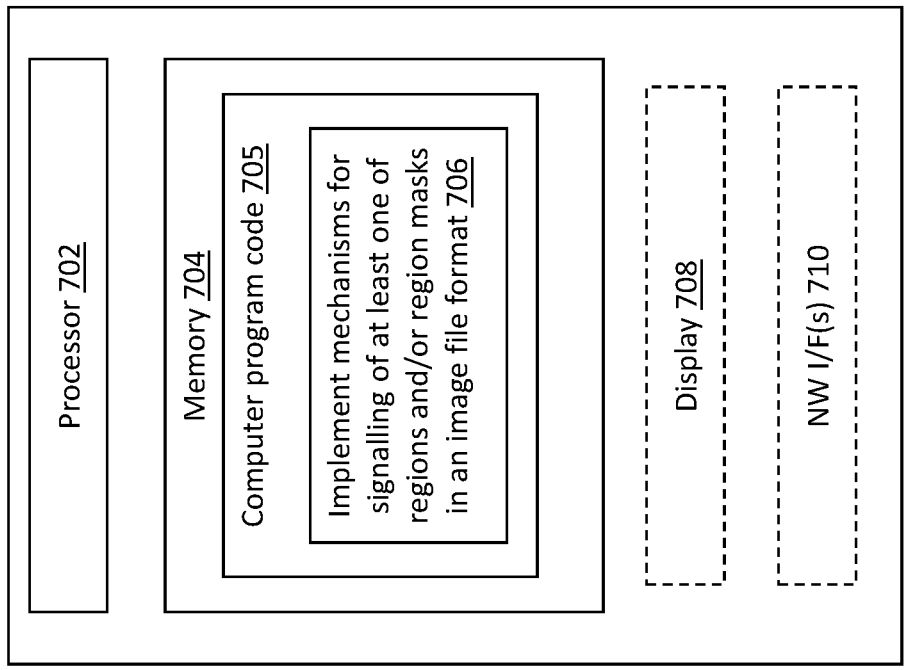
FIG. 7 is an example apparatus configured to implement mechanisms for signaling of at least one of regions and/or region masks in an image file format, in accordance with an embodiment.

The following values are specified:
0: No mask encoding scheme applied
1: DEFLATE compressed data, for example, as defined in RFC 1951
2: ZLIB compressed data, for example, as defined in RFC 1950
other values: reserved FIG. 7 is an example apparatus 700, which may be implemented in hardware, configured to implement mechanisms for signaling of at least one of regions and/or region masks in an image file format, based on the examples described herein. The apparatus 700 comprises a processor 702, at least one non-transitory memory 704 including computer program code 705, wherein the at least one memory 704 and the computer program code 705 are configured to, with the at least one processor 702, cause the apparatus to implement mechanisms for signalling of at least one of regions and/or region masks in an image file format 706. The apparatus 700 optionally includes a display 708 that may be used to display content during rendering. The apparatus 700 optionally includes one or more network (NW) interfaces (I/F(s)) 710. The NW I/F(s) 710 may be wired and/or wireless and communicate over the Internet/other network(s) via any communication technique. The NW I/F(s) 710 may comprise one or more transmitters and one or more receivers. The N/W I/F(s) 710 may comprise standard well-known components such as an amplifier, filter, frequency-converter, (de)modulator, and encoder/decoder circuitry(ies) and one or more antennas.

The apparatus 700 may be a remote, virtual or cloud apparatus. The apparatus 700 may be either a coder or a decoder, or both a coder and a decoder. The at least one memory 704 may be implemented using any suitable data storage technology, such as semiconductor based memory devices, flash memory, magnetic memory devices and systems, optical memory devices and systems, fixed memory and removable memory. The at least one memory 704 may comprise a database for storing data. The apparatus 700 need not comprise each of the features mentioned, or may comprise other features as well. The apparatus 700 may correspond to or be another embodiment of the apparatus 50 shown in FIG. 1 and FIG. 2, or any of the apparatuses shown in FIG. 3. The apparatus 700 may correspond to or be another embodiment of the apparatuses shown in FIG. 9, including UE 110, RAN node 170, or network element(s) 190.

Figure 8:
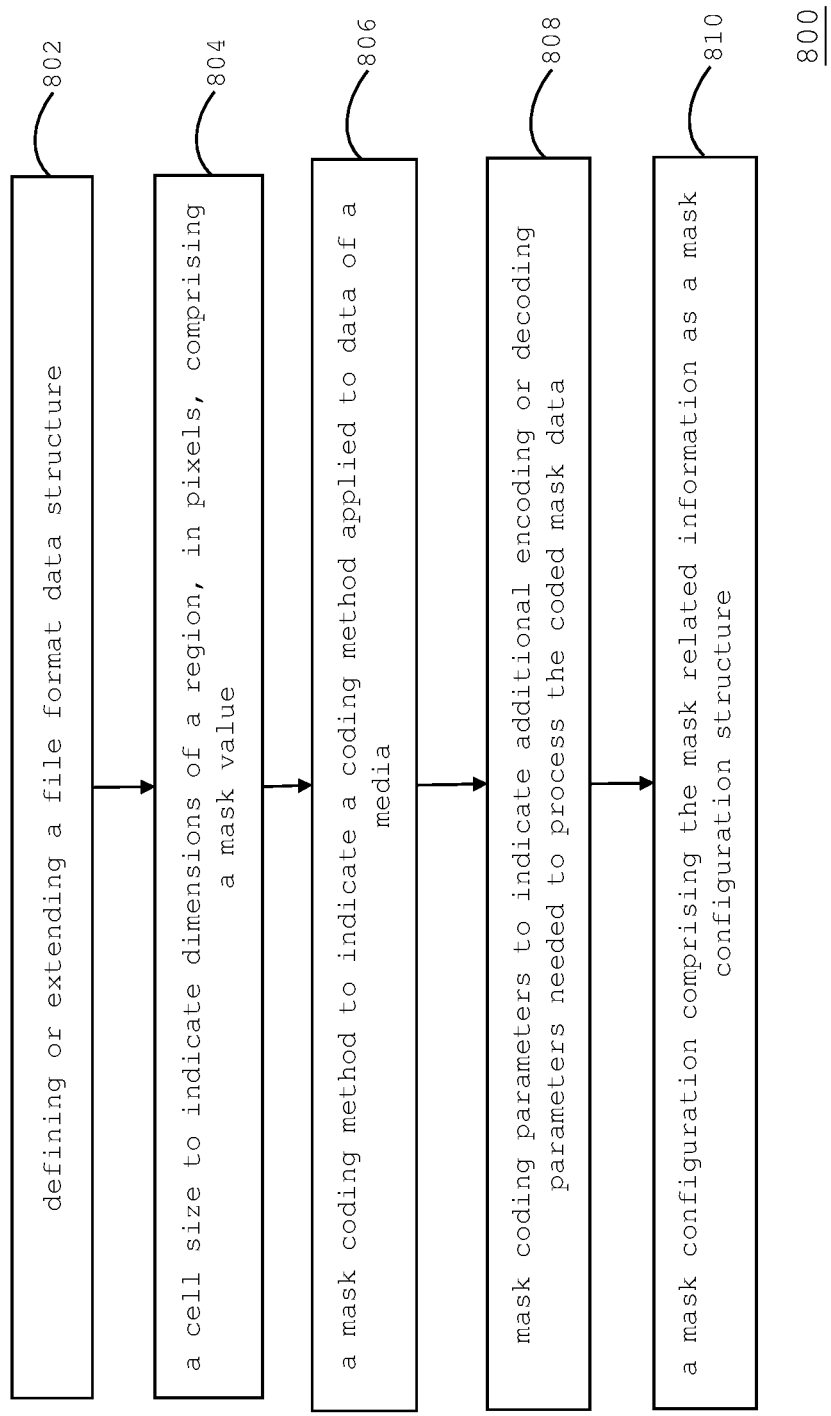
FIG. 8 is an example method to implement mechanisms for signaling of at least one of regions and/or region masks in an image file format, in accordance with an embodiment.

FIG. 8 is an example method 800 to implement mechanisms for signalling of at least one of regions and/or region masks in an image file format, in accordance with an embodiment. As shown in block 706 of FIG. 7, the apparatus 700 includes means, such as the processing circuitry 702 or the like, for implementing mechanisms for signalling of at least one of regions and/or region masks in an image file format. At 802, the method 800 includes defining or extending a file format data structure to include a cell size, a mask coding method, mask coding parameters, and a mask configuration. At 804, the method 800 includes, wherein the cell size indicates dimensions of a region, in pixels, comprising a mask value. In an embodiment, an M×N region is represented by a mask value. For example, when the region has dimensions 20×20 pixels, M=2, and N=2, then the mask will have dimensions of 10×10. In this embodiment, M×N indicates a pixel dimension, which maps to one mask value. At 806, the method 800 includes, wherein the mask coding method indicates a coding method applied to a mask or data of a media. At 808, the method 800 includes, wherein the mask coding parameters indicate additional encoding or decoding parameters needed to process the coded mask data. At 810, the method 800 includes, wherein a mask configuration includes the mask related information as a mask configuration structure.

Figure 9:
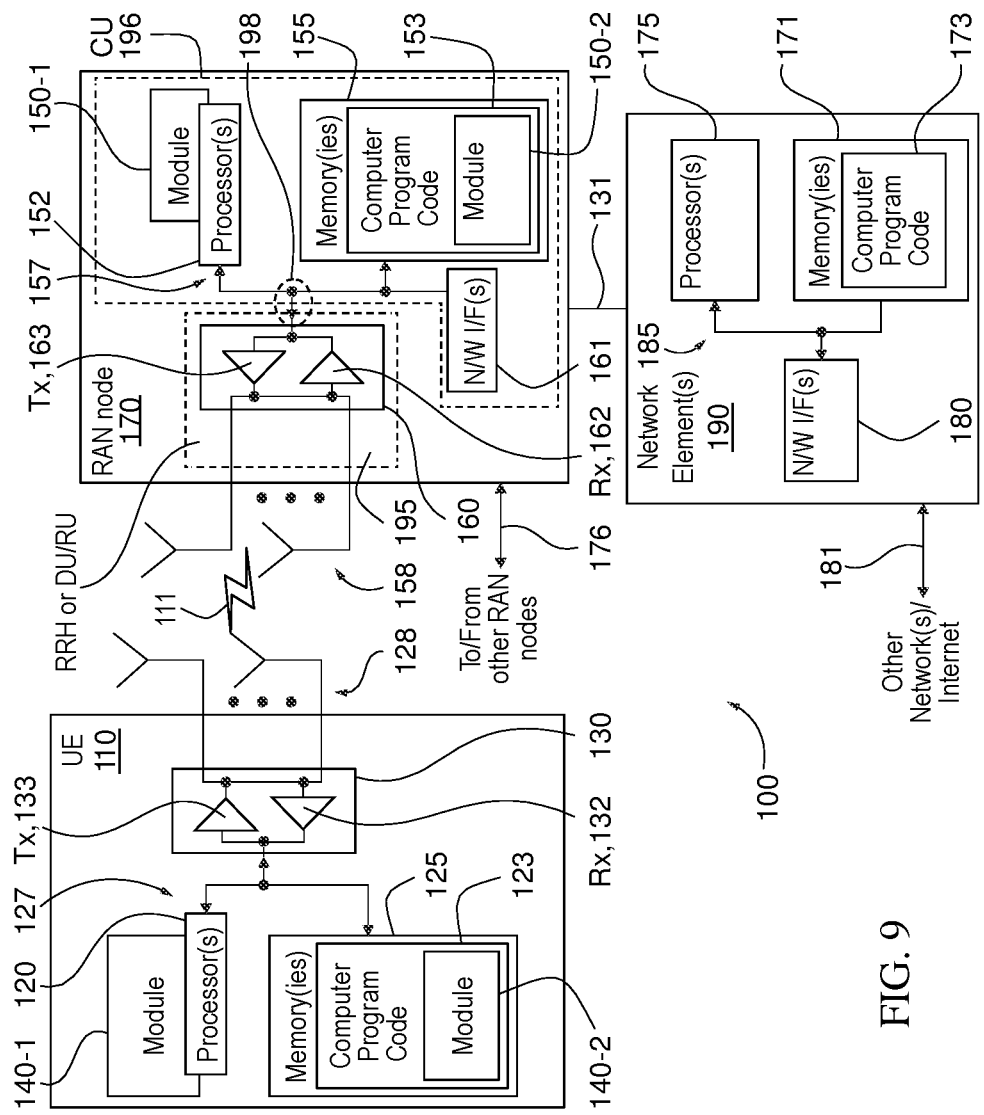
FIG. 9 is a block diagram of one possible and non-limiting system in which the example embodiments may be practiced.

Turning to FIG. 9, this figure shows a block diagram of one possible and non-limiting system in which the example embodiments may be practiced. A user equipment (UE) 110, radio access network (RAN) node 170, and network element(s) 190 are illustrated. In the example of FIG. 1, the user equipment (UE) 110 is in wireless communication with a wireless network 100. A UE is a wireless device that can access the wireless network 100. The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a module 140, comprising one of or both parts 140-1 and/or 140-2, which may be implemented in a number of ways. The module 140 may be implemented in hardware as module 140-1, such as being implemented as part of the one or more processors 120. The module 140-1 may be implemented also as an integrated circuit or through other hardware such as a programmable gate array. In another example, the module 140 may be implemented as module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with RAN node 170 via a wireless link 111.

The RAN node 170 in this example is a base station that provides access by wireless devices such as the UE 110 to the wireless network 100. The RAN node 170 may be, for example, a base station for 5G, also called New Radio (NR). In 5G, the RAN node 170 may be a NG-RAN node, which is defined as either a gNB or an ng-eNB. A gNB is a node providing NR user plane and control plane protocol terminations towards the UE, and connected via the NG interface to a 5GC (such as, for example, the network element(s) 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols f51 of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the RAN node 170 and centralized elements of the RAN node 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, for example, as part of a RU, but some examples of this may have the transceiver 160 as part of a separate RU, for example, under control of and connected to the DU 195. The RAN node 170 may also be an eNB (evolved NodeB) base station, for LTE (long term evolution), or any other suitable base station or node.

The RAN node 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The RAN node 170 includes a module 150, comprising one of or both parts 150-1 and/or 150-2, which may be implemented in a number of ways. The module 150 may be implemented in hardware as module 150-1, such as being implemented as part of the one or more processors 152. The module 150-1 may be implemented also as an integrated circuit or through other hardware such as a programmable gate array. In another example, the module 150 may be implemented as module 150-2, which is implemented as computer program code 153 and is executed by the one or more processors 152. For instance, the one or more memories 155 and the computer program code 153 are configured to, with the one or more processors 152, cause the RAN node 170 to perform one or more of the operations as described herein. Note that the functionality of the module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, for example, link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 for gNB implementation for 5G, with the other elements of the RAN node 170 possibly being physically in a different location from the RRH/DU, and the one or more buses 157 could be implemented in part as, for example, fiber optic cable or other suitable network connection to connect the other elements (for example, a central unit (CU), gNB-CU) of the RAN node 170 to the RRH/DU 195. Reference 198 also indicates those suitable network link (s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality, and which provides connectivity via a link or links 181 with a further network, such as a telephone network and/or a data communications network (for example, the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the network element(s) 190, and note that both 5G and LTE functions might be supported. The RAN node 170 is coupled via a link 131 to the network element 190. The link 131 may be implemented as, for example, an NG interface for 5G, or an S1 interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, RAN node 170, network element(s) 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of modules 140-1, 140-2, 150-1, and 150-2 may be configured to implement mechanisms for signalling of at least one of regions and/or region masks in an image file format based on the examples described herein. Computer program code 173 may also be configured to implement mechanisms for signaling of at least one of regions and/or region masks in an image file format based on the examples described herein.

As described above, FIG. 8 includes a flowchart of an apparatus (e.g. 50, 600, or 700), method, and computer program product according to certain example embodiments. It will be understood that each block of the flowchart(s), and combinations of blocks in the flowchart(s), may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory (e.g. 58, 125, 604 or 704) of an apparatus employing an embodiment of the present invention and executed by processing circuitry (e.g. 56, 120, 602 or 702) of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowchart(s) of FIG. 8. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Accordingly, the description is intended to embrace all such alternatives, modifications and variances which fall within the scope of the appended claims. Although specific terms are employed herein, they are used in a generic and descriptive sense only and not for purposes of limitation.

It should be understood that the foregoing description is only illustrative. Various alternatives and modifications may be devised by those skilled in the art. For example, features recited in the various dependent claims could be combined with each other in any suitable combination(s). In addition, features from different embodiments described above could be selectively combined into a new embodiment. Accordingly, the description is intended to embrace all such alternatives, modifications and variances which fall within the scope of the appended claims.

What is claimed is:

1. An apparatus comprising:
at least one processor; and
at least one memory including computer program code;
wherein the at least one memory and the computer program code are configured to, with the at least one processor, cause the apparatus at least to perform:
define or extend a file format data structure for a mask item to comprise:
a cell size to indicate dimensions of a region, in pixels, wherein the region is represented by a mask value;
a mask coding method to indicate a coding method applied to a particular area of a media, wherein the region maps to the particular area of the media, wherein the mask coding method is represented by a mask coding method value;
one or more mask coding parameters to indicate additional encoding or decoding parameters needed to process the particular area of the media; and
a mask configuration for the mask item comprising mask related information as a mask configuration structure.

2. The apparatus of claim 1, wherein the mask coding method comprises values to indicate one or more of the following:
no mask encoding scheme applied;
DEFLATE compressed data coding is applied; or
ZLIB compressed data coding is applied.

3. The apparatus of claim 1, wherein the mask coding parameters further indicate a number of bytes in a coded mask array, when the mask coding method comprises a predetermined value.

4. The apparatus of claim 3, wherein a value of the mask coding parameters is reserved, when the mask coding method comprises a value other than the predetermined value.

5. The apparatus of claim 1, wherein the apparatus is further caused to define an item type, wherein an image item with the item type mski is a mask item that defines the mask.

6. The apparatus of claim 1, wherein the mask configuration comprises at least one of bits per pixel or byte packing information.

7. The apparatus of claim 6, wherein when the bits per pixel information of the mask configuration comprises 1, 2 or 4, pixels packed per byte are 8, 4 or 2, respectively, and wherein the byte packing information comprises a big-endian order.

8. The apparatus of claim 7, wherein no padding is put at the end of each line and a last data byte is padded, when a mask width is not a multiple of 8 pixels.

9. The apparatus of claim 6, wherein when the bits per pixel information of the mask configuration to 8, 16 or 24, the mask value of a pixel is represented with 1, 2 or 3 bytes, respectively, and wherein bytes of a pixel are serialized starting from the most significant byte.

10. A method comprising:
defining or extending a file format data structure for a mask item to comprise:
a cell size to indicate dimensions of a region, in pixels, wherein the region is represented with a mask value;
a mask coding method to indicate a coding method applied to a mask or data an area of a media, wherein the region maps to the area of the media, wherein the mask coding method is represented with a mask coding method value;
one or more mask coding parameters to indicate additional encoding or decoding parameters needed to process the area of the media; and
a mask configuration for the mask item comprising mask related information as a mask configuration structure.

11. The method of claim 10, wherein the mask coding method comprises values to indicate one or more of the following:
no mask encoding scheme applied;
DEFLATE compressed data coding is applied; or
ZLIB compressed data coding is applied.

12. The method of claim 10, wherein the mask coding parameters further indicate a number of bytes in a coded mask array, when the mask coding method comprises a predetermined value.

13. The method of claim 12, wherein a value of the mask coding parameters is reserved, when the mask coding method comprises a value other than the predetermined value.

14. The method of claim 10 further comprising defining an item type, wherein an image item with the item type mski is a mask item that defines the mask.

15. The method of claim 10, wherein the mask configuration comprises at least one of bits per pixel or byte packing information.

16. The method of claim 15, wherein when the bits per pixel information of the mask configuration comprises 1, 2 or 4, pixels packed per byte are 8, 4 or 2, respectively, and wherein the byte packing information comprises a big-endian order.

17. The method of claim 16, wherein no padding is put at the end of each line and a last data byte is padded, when a mask width is not a multiple of 8 pixels.

18. The method of claim 17, wherein when the bits per pixel information of the mask configuration to 8, 16 or 24, the mask value of a pixel is represented with 1, 2 or 3 bytes, respectively, and wherein bytes of a pixel are serialized starting from the most significant byte.

19. A non-transitory computer readable medium comprising program instructions for causing an apparatus to perform at least the following:
defining or extending a file format data structure for a mask item to comprise:
a cell size to indicate dimensions of a region, in pixels, wherein the region is represented with a mask value;
a mask coding method to indicate a coding method applied to an area of a media, wherein the region maps to the area of the media, wherein the mask coding method is represented with a mask coding method value;
one or more mask coding parameters to indicate additional encoding or decoding parameters needed to process the area of the media; and
a mask configuration for the mask item comprising mask related information as a mask configuration structure.

20. The non-transitory computer readable medium of claim 19, wherein the mask coding method comprises values to indicate one or more of the following:
no mask encoding scheme applied;
DEFLATE compressed data coding is applied; or
ZLIB compressed data coding is applied.

* * * * *